United States Patent Office 2,852,524
Patented Sept. 16, 1958

2,852,524

3,3-DIPHENYL-1,2,4-OXADIAZOLIDINE-5-ONE

Rocco Joseph Lopresti, Brooklyn, N. Y., and Sidney Robert Safir, River Edge, N. J., assignors to American Cyanamid Company, New York, N. Y., a corporation of Maine No Drawing. Application September 13, 1957
Serial No. 683,712

2 Claims. (Cl. 260—307)

This invention relates to 3,3-diphenyl-1,2,4-oxadiazolidine-5-one of the formula:

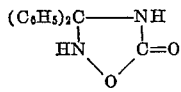

The above compound has shown strong protective action against electroshock and is useful as an anti-epileptic drug.

The novel compound is prepared by reacting N-carbethoxydiphenylketimine with hydroxylamine to form ethyl-(α-hydroxyaminobenzhydryl)carbamate which, in turn, is then reacted with a lower alkoxide, i. e., sodium methoxide, to form the final compound. The reaction is preferably carried out in an alcoholic solution, i. e., methanol. The temperature of the reaction ranges from about 0 to 50° C. The product is isolated from the reaction mixture in any convenient manner and may be purified by recrystallization in a standard manner.

The invention will be described in greater detail in conjunction with the following specific example.

EXAMPLE

3,3-diphenyl-1,2,4-oxadiazolidine-5-one

A solution of 4.9 grams (0.15 mole) of hydroxylamine and 14.8 grams (0.059 mole) of N-carbethoxydiphenylketimine [Aust. J. Sci. Research A1, 330 (1948)] in 100 milliliters of methanol was heated on a steam-bath for 5 minutes at 50°. Upon cooling, precipitation occurred. The mixture was filtered to give 7.9 grams of ethyl (α-hydroxyaminobenzhydryl)-carbamate, M. P. 81–83°. A solution of 5 grams (0.017 mole) of ethyl (α-hydroxyaminobenzhydryl)carbamate in 250 milliliters of anhydrous methanol to which had been slowly added 1 gram (0.017 mole) of sodium methoxide in 100 milliliters of anhydrous methanol, was permitted to stand for 4½ hours at room temperature and was then evaporated to yield a solid. The crude product was treated with water and filtered. The filtrate upon acidification yielded 4 grams of the desired product; M. P. 134–142°. Recrystallization of this material from benzene-ethanol gave 2.8 grams of 3,3-diphenyl-1,2,4-oxadiazolidine-5-one; M. P. 150–153°.

*Analysis.*—Calculated for $C_{14}H_{12}N_2O_2$: C, 70.0; H, 5.0; N, 11.7. Found: C, 70.2; H, 5.3; H, 11.9.

We claim:
1. 3,3-diphenyl-1,2,4-oxadiazolidine-5-one.
2. A method of preparing 3,3-diphenyl-1,2,4-oxadiazolidine-5-one which comprises reacting N-carbethoxydiphenylketimine with hydroxylamine to form ethyl(α-hydroxyaminobenzhydryl)carbamate and reacting the compound so formed with a lower alkoxide to form the final product.

No references cited.